(12) United States Patent
Nagai (10) Patent No.: US 6,818,960 B2
(45) Date of Patent: Nov. 16, 2004

(54) MAGNETIC RECORDING MEDIUM AND METHOD OF FABRICATING THE SAME

(75) Inventor: Nobuyuki Nagai, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/437,506

(22) Filed: May 14, 2003

(65) Prior Publication Data
US 2003/0218225 A1 Nov. 27, 2003

(30) Foreign Application Priority Data

May 23, 2002 (JP) .................................... P2002-149632

(51) Int. Cl.[7] .......................... H01L 29/82; H01L 43/00
(52) U.S. Cl. .............................. 257/421; 257/E27.006; 360/135
(58) Field of Search ....................... 257/421, E27.006; 360/135, 131; 428/65.5

(56) References Cited

U.S. PATENT DOCUMENTS 5,773,124 A * 6/1998 Ishikawa et al. ............ 428/141
5,815,343 A * 9/1998 Ishikawa et al. ......... 360/97.01
5,879,569 A * 3/1999 Matsumoto et al. .......... 216/22

* cited by examiner

*Primary Examiner*—Hoai Ho
*Assistant Examiner*—Tu-Tu Ho
(74) *Attorney, Agent, or Firm*—Robert J. Depke; Holland & Knight LLP (57) ABSTRACT

A magnetic recording medium improved in spacing loss and durability is disclosed. The magnetic recording medium is composed so that a magnetic layer is formed on a non-magnetic support, further thereon a non-magnetic protective layer having projected portions formed thereon in a discrete manner according to a thickness distribution, and further thereon a lubricant layer is formed so as to produce surface projections. In other words, the projected portions are formed in a discrete manner to the non-magnetic protective layer formed on the magnetic layer, where the non-magnetic protective layer is principally intended for the purpose of rust prevention or the like for the magnetic layer. The whole portion of the non-magnetic protective layer inclusive of the projected portions is composed with the same material.

11 Claims, 3 Drawing Sheets

MAGNETIC RECORDING MEDIUM AND METHOD OF FABRICATING THE SAME

CROSS REFERENCES TO RELATED APPLICATIONS

The present invention claims priority to its priority document No. 2002-149632 filed in the Japanese Patent Office on May 23, 2002, the entire contents of which being incorporated by reference herein.

BACKGROUND OF THE INVENTION

1. Field of the Invention

The present invention relates to a magnetic recording medium and a method of fabricating the same, and in particular to a magnetic recording medium which is capable of ensuring itself and a magnetic head used for recording and/or reproduction thereto and therefrom with improved durability and electromagnetic conversion characteristics, so as to be suitably adopted to high-density magnetic recording.

2. Description of the Related Art

Raising of recording density of magnetic recording media generally demands improvement in the frequency characteristics depending on a higher coercive force and a smoother surface, where a critical problem resides in how successfully the durability can be improved while keeping a desirable level of signal-to-noise ratio (S/N ratio).

For this purpose, various improvements and approaches have been made. A number of proposals include a method of precisely producing projections by forming a high-precision pattern on a non-magnetic support (Japanese Laid-Open Patent Publication No. 10-55535), and a method of producing fine projections by allowing a portion of grains contained in a magnetic layer to expose (Japanese Patent No. 2512005).

SUMMARY OF THE INVENTION

However for a case where fine projections are formed on a surface of a non-magnetic support, and a magnetic layer and a non-magnetic protective layer are further formed on the surface having such projections to thereby produce on a surface thereof, that is on a surface of a magnetic recording medium, new fine projections conforming to the fine projections previously formed on the surface of the support, the magnetic layer can gradually be exposed as the projections wear, since the magnetic layer is composed so as to be entangled into the projections on the surface of the medium. If the magnetic layer is thus exposed, grains in the magnetic layer will be more likely to be removed, and the magnetic layer begins to decompose from such portion.

For a case where the projections are formed by fine grains, it is practically difficult to produce really fine projections since the grains tend to coagulate, and this eventually increases spacing loss with regard to a magnetic head.

The present invention is to provide a magnetic recording medium capable of reducing the spacing loss, improving durability, and further capable of improving reliability and electromagnetic conversion characteristics of a magnetic head used with the magnetic recording medium.

A magnetic recording medium of the present invention is composed so as to have a magnetic layer, a non-magnetic protective layer having projected portions formed thereon in a discrete manner according to a thickness distribution, and a lubricant layer, sequentially stacked on a non-magnetic support to have a surface projection formed thereon. That is, in the present invention, the projected portions are formed onto the non-magnetic protective layer which is intrinsically provided on the magnetic layer typically for the purpose of rust prevention of the magnetic layer. The non-magnetic protective layer composing the projected portions can be formed directly on the magnetic layer, and the entire portion thereof including the.projected portions can be composed of the same material. The non-magnetic protective layer can be composed as having a stacked structure of a first non-magnetic protective layer and a second non-magnetic protective layer, and the projected portions can be formed in a discrete manner according to a thickness distribution by the first and second non-magnetic protective layers, where either one of these non-magnetic protective layers is formed in a discontinuous and discrete manner.

Or, the non-magnetic protective layer may be formed so as to extend over a discontinuous metal layer which is formed on the magnetic layer, and so as to form the projected portion according to a thickness distribution of such non-magnetic protective layer. This successfully composes the non-magnetic protective layer, inclusive of the projected portions, with the same material. The discontinuous metal layer herein is composed of a metal having an electric conductivity higher than that of the magnetic layer, and portions with the non-magnetic protective layer formed on the metal layer is made thicker than portions with the non-magnetic protective layer directly formed on the magnetic layer without having the metal layer therebetween. This produces the thickness distribution of the non-magnetic protective layer. That is, the projected portions are limitedly formed only on the discontinuous metal layer.

A method of fabricating a magnetic recording medium of the present invention comprises a step of forming a magnetic layer on a non-magnetic support, a step of forming a non-magnetic protective layer having projected portions formed thereon in a discrete manner according to a thickness distribution, coming next to the step for forming the magnetic layer, and a step of forming a lubricant layer.

The step for forming the non-magnetic protective layer having the projected portions formed thereon in a discrete manner further comprises a step of forming a first non-magnetic protective layer and a step of forming a second non-magnetic protective layer. In the step, either one of the steps, typically the step for forming a lower non-magnetic protective layer herein, is dedicated for formation over the entire surface, and the other step is dedicated for formation in a discrete manner based on mask processing. The non-magnetic protective layer having a thickness distribution can thus be formed with portions where the first and second non-magnetic protective layers are stacked and portions composed only of a single layer, that is, either one of the first and second non-magnetic layers. The thicker portions thus obtained serve as the projected portions.

In another method of the present invention, the step of forming the non-magnetic protective layer having formed thereon the projected portions further comprises a step of forming a discontinuous metal layer having an electric conductivity higher than that of the magnetic layer, and a step of forming a non-magnetic protective layer over the entire surface so as to cover also the discontinuous metal layer as well as the magnetic layer. The projected portions are formed based on difference in the growth speed of the non-magnetic protective layer between areas having the discontinuous metal layer and areas having no discontinuous metal layer but exposing the magnetic layer within through-holes. The non-magnetic protective layer is made thicker at portions on the discontinuous metal layer, and the thicker portions serve as the projected portions.

In other words, the present invention is to produce necessary surface projections on the surface of the magnetic layer by forming the projected portions not on the non-magnetic support or on the magnetic layer formed thereon as in the conventional technique, but instead on the non-magnetic protective layer formed on the magnetic layer.

In the method of fabricating a magnetic recording medium of the present invention, the non-magnetic protective layer having projected portions formed thereon is formed after the step of forming the magnetic layer on the non-magnetic support.

That is, in the magnetic recording medium and a method of fabricating a magnetic recording medium of the present invention, the projected portions are formed on the non-magnetic protective layer in a discrete manner irrespective of the constitution of the magnetic layer per se and of fabrication method. This is successful in avoiding adverse effects of the projected portions on the characteristics of the magnetic layer and durability.

As described in the above, in the magnetic recording medium of the present invention, the projected portions become less likely to drop off since the projected portions are formed based on the thickness distribution of the non-magnetic protective layer, and since the entire portion of the non-magnetic protective layer inclusive of such projected portions is composed of the same material. The magnetic recording medium of the present invention having no magnetic layer in the projected portions, unlike the conventional constitution, is also successful in effectively avoiding destruction of the magnetic layer even if the projected portions should wear under sliding contact with a magnetic head, and in improving running ability and durability.

According to the method of fabricating a magnetic recording medium of the present invention, the height of the projected portions can precisely be controlled. This successfully composes the magnetic recording medium having a small spacing loss and excellent electro-magnetic conversion characteristics.

BRIEF DESCRIPTION OF THE DRAWINGS

The above and other objects, features and advantages of the present invention will become more apparent from the following description of the presently preferred exemplary embodiment of the invention taken in conjunction with the accompanying drawings, in which.

DETAILED DESCRIPTION OF THE PREFERRED EMBODIMENTS

Figure 1:
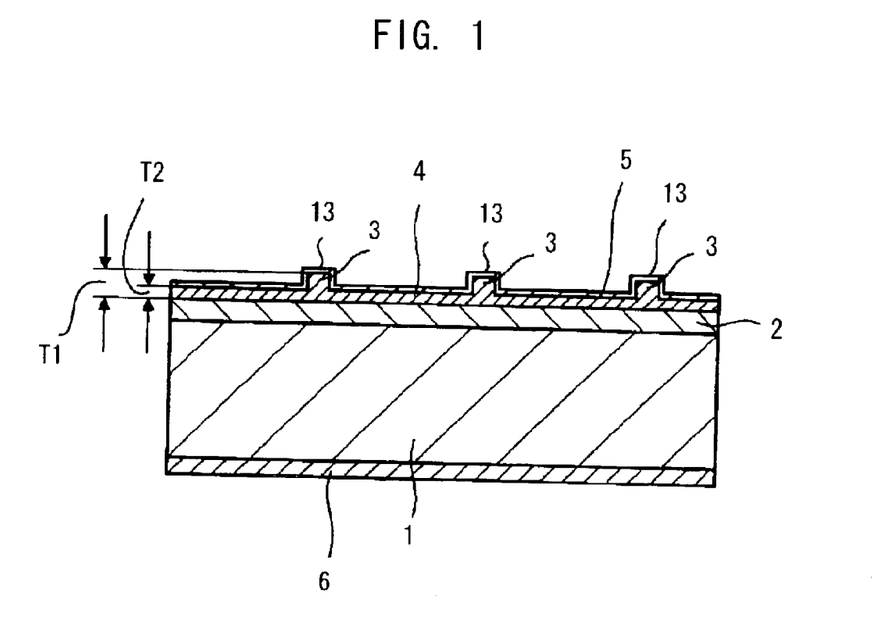
FIG. 1 is a schematic sectional view showing a basic constitution of a magnetic recording medium of the present invention.

In a basic constitution of a magnetic recording medium of the present invention as shown in a schematic sectional view of FIG. 1, a magnetic layer 2 is formed on a non-magnetic support 1, and further thereon a non-magnetic protective layer 4 having a thickness distribution, according to which projected portions 3 are formed in a discrete manner, is formed. In other words, the non-magnetic protective layer 4 has portions having a thickness $T_1$, larger than that in the other portions and being formed in a spot-wise manner, where the projected portions 3 are composed of these portions having the thickness $T_1$.

On an entire surface of the non-magnetic protective layer 4, a lubricant layer 5 is formed. The resultant constitution is such that surface projections 13 are formed on the surface of the medium, that is, on a surface of the lubricant layer 5, conforming to the projected portions 3 of the non-magnetic protective layer 4. In other words, in the constitution of the present invention, the projected portions for forming the surface projections 13 of the recording medium are never formed in the magnetic layer 2. In thus-composed magnetic recording medium, the lubricant layer 5 is generally obtained almost in a form of unimolecular layer along the surface of the non-magnetic protective layer 4, where polar groups of the lubricant layer 5 bind with the surface of the non-magnetic protective layer 4. The shape, height and so forth of the surface projections 13 are in conformity with the shape, height and so forth of the projected portions 3 on the surface of the non-magnetic protective layer 4.

Next paragraphs will describe specific embodiments of the magnetic recording medium according to the present invention. It is to be noted that the present invention is by no means limited to these embodiments.

[First Embodiment]

Figure 2:
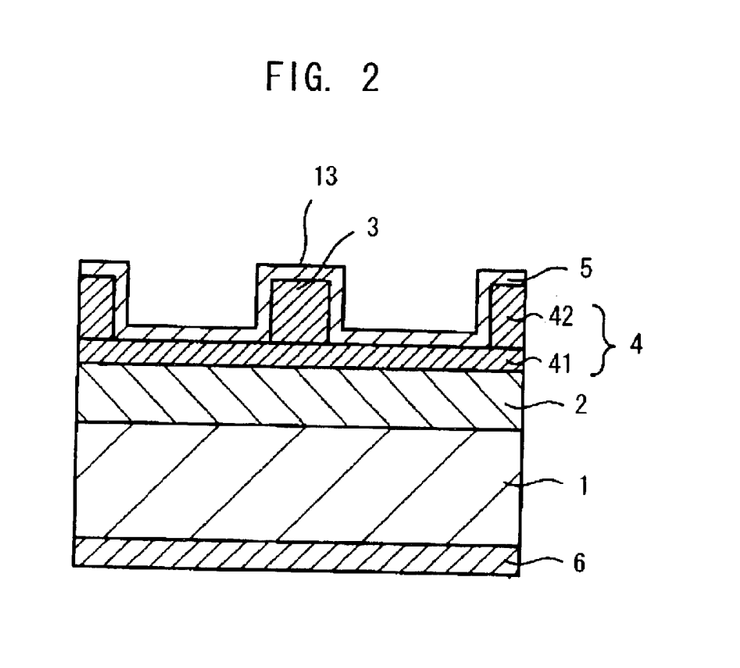
FIG. 2 is a schematic sectional view showing an exemplary constitution of the magnetic recording medium according to one embodiment of the present invention.

In the magnetic recording medium according to a first embodiment shown in a schematic sectional view of FIG. 2, a magnetic layer 2 is formed on a non-magnetic support 1, and directly on the magnetic layer 2, a non-magnetic protective layer 4 having projected portions 3 distributed in a predetermined frequency, that is, in a distribution density (/mm$^2$), is formed.

The non-magnetic protective layer 4 further comprises a first non-magnetic protective layer 41 and a second non-magnetic protective layer 42 stacked on the other. Either one of the first and second non-magnetic protective layers 41 and 42 is formed over the entire surface, and the other one is discontinuously formed, typically in a spot-wise manner. In a preferable case, a lower layer, which is the first non-magnetic protective layer 41 in FIG. 2, is formed over the entire surface, and an upper layer, or the second non-magnetic protective layer 42 is discontinuously formed.

Thus the portions where both of the first and second non-magnetic protective layers 41 and 42 reside will have the thickness $T_1$ larger than the thickness $T_2$ of the portions where only either one of the first and second non-magnetic protective layers 41 and 42 resides, and the aforementioned projected portions 3 are composed of the portions having the larger thickness $T_1$. If the first and second non-magnetic protective layers 41 and 42 are formed using the same material, the non-magnetic protective layer 4 inclusive of the projected portions 3 can be composed of the same material as a whole.

On the non-magnetic protective layer 4, a lubricant layer 5 is formed. On the side of the non-magnetic support 1 opposite to that having the magnetic layer 2, that is, on the back surface, a back-coat layer 6 is formed.

[Second Embodiment]

Figure 3:
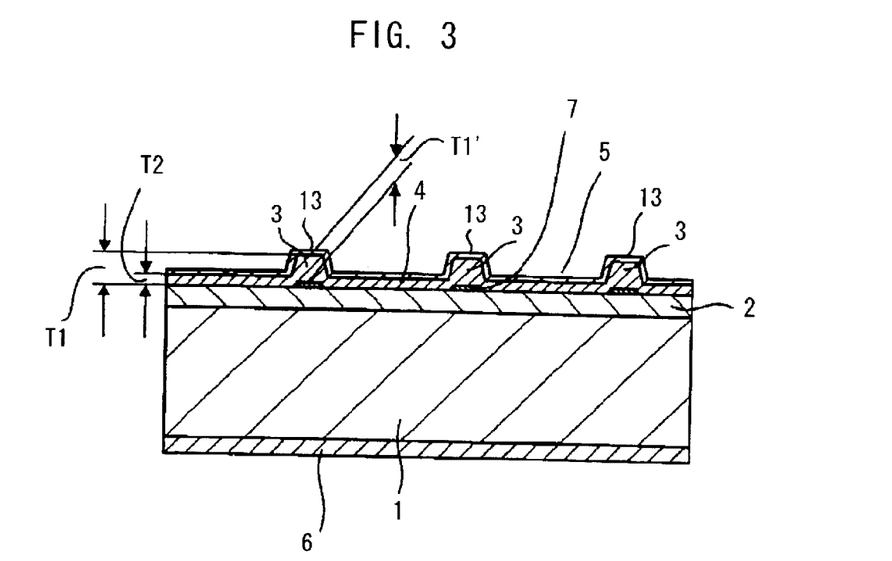
FIG. 3 is a schematic sectional view showing an exemplary constitution of the magnetic recording medium according to another embodiment of the present invention.

Also in the magnetic recording medium according to a second embodiment shown in a schematic sectional view of FIG. 3, a magnetic layer 2 composed of a metal thin film is formed on one main surface of a non-magnetic support 1, and on the magnetic layer 2, a non-magnetic protective layer 4 having projected portions 3 formed thereon in a discrete manner, and a lubricant layer 5 are sequentially formed. The resultant constitution is such that surface projections 13 are formed on the surface of the lubricant layer 5, conforming to the projected portions 3 of the non-magnetic protective layer 4. On the back surface of the non-magnetic support 1, a back-coat layer 6 is formed. In the second embodiment shown in FIG. 3, a discontinuous metal layer 7 is formed on the magnetic layer 2 in a spot-wise manner, or distributed as islands, and the non-magnetic protective layer 4 is formed so as to extend over the discontinuous metal layer 7. The non-magnetic protective layer 4 herein has a thickness distribution, in which a larger thickness $T_1$ is attained over the discontinuous metal layer 7, and a smaller thickness $T_2$ is attained in the portion formed directly on the magnetic layer 2 without being interposed by the discontinuous metal layer 7. The projected portions 3 are composed of the portions having the larger thickness $T_1$.

In the aforementioned embodiments, the surface of the non-magnetic support 1 has a roughness Ra (arithmetical means roughness) of 1 nm or less, so as not to adversely affect the characteristics of the magnetic layer 2. The thickness distribution of the non-magnetic protective layer 4 is within a range from 3 nm to 20 nm in terms of an average thickness difference between thicker portions and thinner portions thereof. The average thickness of the thinner portions of the non-magnetic protective layer 4 is 1 nm to 5 nm. The average frequency of the projected portions 3 is controlled within a range from $1 \times 10^7/mm^2$ to $8 \times 10^7/mm^2$.

The non-magnetic protective layer 4 of the magnetic recording medium typically described in the above embodiments can be composed of a hard carbon film.

The non-magnetic support 1 of the magnetic recording medium of the present invention may have any form of film, sheet, disk, card drum and so forth. Examples of materials for composing the non-magnetic support 1 include polyesters such as polyethylene terephthalate and polyethylene naphthalate; polyolefins such as polyethylene and polypropylene; cellulose derivatives such as cellulose triacetate and cellulose diacetate; vinyl-base resins such as polyvinyl chloride and polyvinylidene chloride; other plastics such as polycarbonate, polyimide, polyamide and polyamideimide; light metals such as aluminum alloy and titanium alloy; glass; and ceramics.

The magnetic layer 2 can be composed of a ferromagnetic metal thin film. The ferromagnetic metal thin film can be composed of pure metals such as Fe, Co and Ni; alloys such as CoNi, CoPt, CoNiPt, FeCo, FeNi, FeCoNi, FeCoB, CoNiFeB and CoCr; and any ferromagnetic metal materials composed of these alloys and additional metals such as Cr and Al. Use of CoCr in particular can successfully provide a perpendicularly magnetized film. The ferromagnetic metal thin film composing the magnetic film 2 can continuously be formed on the non-magnetic support 1 by any vacuum thin film forming techniques such as the vacuum evaporation process, ion plating process and sputtering process.

The vacuum evaporation process for forming the magnetic layer 2 can be carried out by evaporating a ferromagnetic metal material by resistance heating, radio-frequency induction heating or electron beam heating under the vacuum of $1 \times 10^{-2}$ Pa to $1 \times 10^{-6}$ Pa, whereby the evaporated metal is deposited on the non-magnetic support 1 to form the desired magnetic layer 2. In order to form the magnetic layer 2 having a large coercive force, oblique evaporation is generally adopted, by which the aforementioned ferromagnetic metal materials are obliquely deposited on the non-magnetic support 1. Further higher coercive force can be attained by vacuum evaporation in an oxygen atmosphere.

Next, an exemplary constitution of a vacuum evaporation apparatus, specially designed for carrying out the oblique evaporation will be explained referring to a schematic drawing of FIG. 4. In the vacuum evaporation apparatus, a cooling can 22 having a cylindrical outer circumference is disposed in a vacuum chamber 21, where the cooling can 22 is rotatable counter-clockwise around a shaft center thereof, as indicated by an arrow "a" in the drawing. A film-like or sheet-like long non-magnetic material 23, which is an original material for the non-magnetic support 1, smoothly travels from a feeding roll 24 via the circumferential plane of the cooling can 22 towards a take-up roll 25, while being guided by guide rollers 26 under a predetermined tension. The inner space of the vacuum chamber 21 is typically conditioned to a vacuum of $1 \times 10^{-3}$ Pa or around, and the cooling can 22 disposed therein is cooled at 20° C. or around.

In the vacuum chamber 21, an evaporation source 27, which is a source material for composing the ferromagnetic metal thin film, is disposed so as to face toward the cooling can 22. The evaporation source 27 is composed of a ferromagnetic material such as Co housed in a container such as a crucible. There is also disposed an electron beam source 19. Electron beam 29 emitted from the electron beam source 19 is accelerated to irradiate the source material of the evaporation source 27, to thereby heat the source material, or the ferromagnetic metal material, and allow it to vaporize. Thus-vaporized metal material is allowed to deposit on the long non-magnetic material 23 running along the circumferential plane of the cooling can 22 to thereby form the ferromagnetic metal thin film.

Between the evaporation source 27 and the cooling can 22, a shading plate 30 is disposed. On the shading plate 30, a shutter 31 is attached to be position-adjustable, so as to pass only evaporated grains obliquely incident at a predetermined angle to the long non-magnetic material 23. In this way, the ferromagnetic metal thin film, that is, the magnetic layer 2, is formed through the oblique evaporation process.

In the evaporation of the ferromagnetic metal thin film, it is preferable to supply oxygen gas through an oxygen gas introducing duct (not shown) provided in the vacuum chamber 21 towards the vicinity of the surface of the long non-magnetic material 23 so as to improve the magnetic characteristics, durability and weatherability. Heating of the evaporation source 27 is not limited to heating by the above-described heating means such as using electron beam, but also allowable by using resistance heating means, radio-frequency induction heating means, laser heating means and the like.

The ferromagnetic metal thin film can also be formed through the ion plating process, which is again a kind of vacuum evaporation technique. In this case, a ferromagnetic metal material is evaporated under DC glow discharge or RF glow discharge in an inert gas atmosphere of $1 \times 10^{-2}$ Pa to $1 \times 10^{-1}$ Pa.

The ferromagnetic metal thin film can also be formed through the sputtering process. In this case, glow discharge is excited in an atmosphere mainly containing argon gas at $1 \times 10^{-1}$ Pa to $1 \times 10$ Pa, and generated argon ions are then bombarded against a target to thereby sputter the atoms out from a surface thereof. The process can adopt various kinds of sputtering which include DC double-electrode sputtering, triple-electrode sputtering, radio-frequency sputtering, and magnetron sputtering based on magnetron discharge. For the case the sputtering process is adopted, it is preferable to form an underlying layer such as Cr, W and V layers.

In the formation of the magnetic layer 2 composed of the ferromagnetic metal thin film by any of these film forming process, the magnetic layer 2 can be obtained as a film showing no magnetic anisotropy and having an excellent in-plane isotropy, if an underlying metal layer such as those composed of Bi, Sb, Pb, Sn, Ga, In, Cd, Ge, Si, Tl or the like is preliminarily formed on the long non-magnetic material 23, and the layer is grown vertically on the surface of the non-magnetic support 1. This is preferable for a case where the present invention is applied to a magnetic disk or the like.

The non-magnetic protective layer 4 in the individual embodiments is preferably composed of a carbon film, in particular of a diamond-like carbon having a relatively large hardness. The non-magnetic protective layer 4 can typically be formed through the plasma CVD (chemical vapor deposition) process or the like. Formation of the non-magnetic protective layer 4 by the CVD process is typically carried out by introducing a hydrocarbon gas or a mixed gas of a hydrocarbon gas and an inert gas into a vacuum chamber, allowing the gas to discharge in the vacuum chamber under a pressure of 10 Pa to 100 Pa to generate a hydrocarbon gas plasma, and allowing a carbon film to be the non-magnetic protective layer 4 to deposit on the magnetic layer 2.

The discharge system may be either of the external electrode system and internal electrode system, where the discharge frequency can properly be determined taking film forming conditions into consideration. It is also possible to increase the hardness and to improve the adhesiveness of the non-magnetic protective layer 4 by applying a voltage of 0 to −3 kV to the electrode disposed on the side of the non-magnetic support 1 having the ferromagnetic metal thin film already formed thereon. The hydrocarbons available for the formation of the non-magnetic protective layer 4 include methane, ethane, propane, butane, pentane, hexane, heptane, octane, ethylene, acetylene, propene, butene, pentene and benzene.

Methods of forming the non-magnetic protective layer 4 other than the CVD process include any known thin film forming processes such as the magnetron sputtering process, ion-beam sputtering process and ion-beam plating process.

Next paragraphs will describe specific embodiments of the present invention.

[Embodiment of the First Fabrication Method]

Figures 5A, 5B:
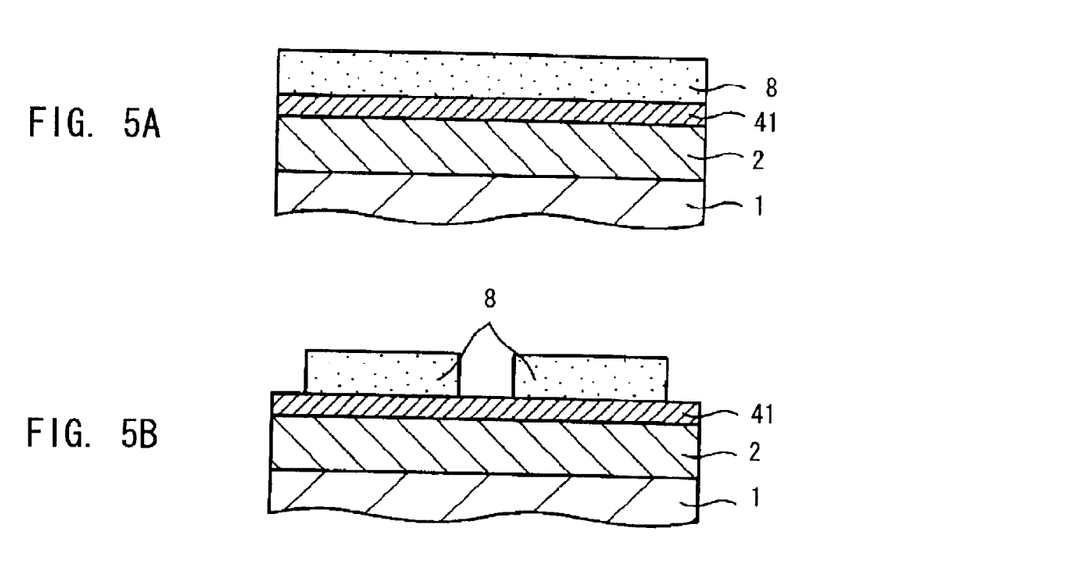
FIGS. 5A through 5D are schematic sectional views sequentially showing process steps for fabricating the magnetic recording medium of the present invention.

This embodiment relates to a method of fabricating a magnetic recording medium according to the aforementioned first embodiment. An exemplary process will be described referring to process charts shown in FIGS. 5A through 5D. First as shown in FIG. 5A, on the non-magnetic support 1 having the magnetic layer 2 already formed thereon, more specifically on the original long non-magnetic material composing the non-magnetic support, a first non-magnetic protective layer 41 typically composed of a carbon film is formed over the entire surface typically by the CVD process. On the entire surface of the first non-magnetic protective layer 41, a photo-resist layer 8 is then formed.

Figure 5C:
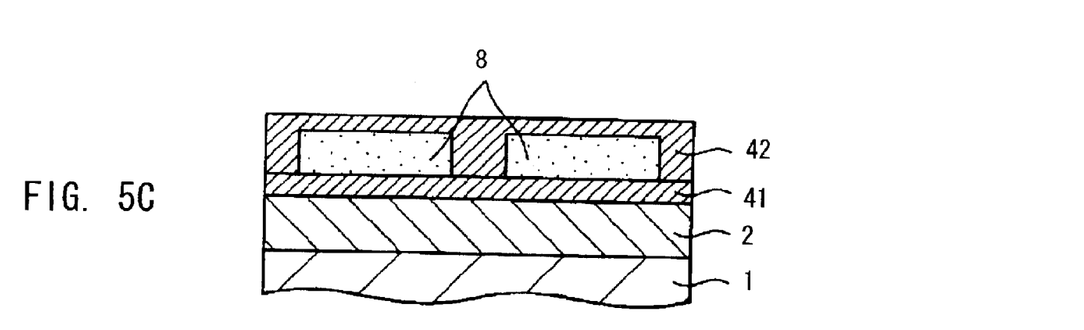

The photo-resist layer 8 is then subjected to pattern exposure and development, so as to finally obtain a photo-resist pattern, as shown in FIG. 5B, having openings in portions where the projected portions 3 are to be formed. Next as shown in FIG. 5C, a material layer same as that composing the first non-magnetic protective layer 41, which is a carbon film for example, is formed over the entire surface including the photo-resist layer 8 typically by the CVD process, to thereby form a second non-magnetic protective layer 42.

Figure 5D:
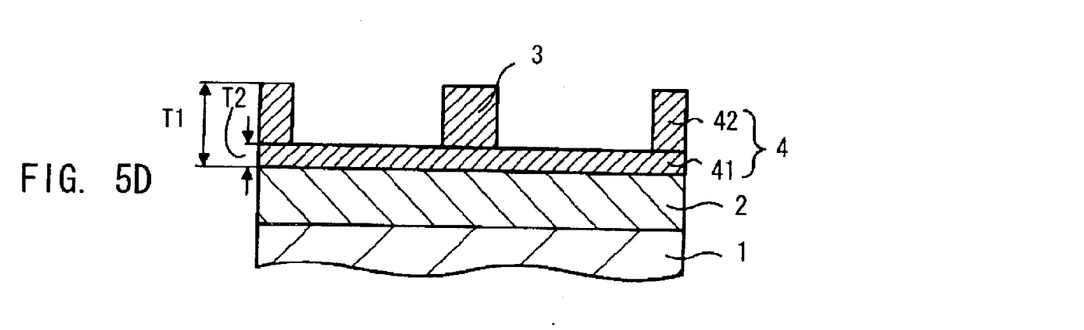

Next as shown in FIG. 5D, the photo-resist layer 8 is dissolved using an organic solvent which is same as that used for preparing the photo-resist, to thereby remove the photo-resist layer 8 together with portions of the second non-magnetic protective layer 42 reside thereon. This process is generally known as the lift-off process. By this process, the non-magnetic protective layer 4 can have thicker portions formed in a spot-wise manner in the area where the second non-magnetic protective layer 42 is remained unetched, in a thickness of $T_1$ ascribable to a stack of the first and second non-magnetic protective layers 41 and 42, and can have thinner portions in the residual area in a thickness of $T_2$ ascribable only to the first non-magnetic protective layer 41. Thus the non-magnetic protective layer 4 can have the projected portions 3 according to the thickness distribution thereof. In this embodiment, the entire portion of the non-magnetic protective layer 4 inclusive of projected portions 3 having a thickness of $T_1$ is formed with the same material.

Next on the non-magnetic protective layer 4, the lubricant layer 5 is formed through coating. The lubricant layer 5 can typically be formed by using perfluorocarboxylic acid, perfluoroalkylsulfonic acid and perfluoropolyether, by solution coating, vacuum evaporation, or the like. By this process, the magnetic recording medium having a constitution corresponded to the magnetic recording medium shown in FIG. 2 is obtained, in which the magnetic layer 2, the non-magnetic protective layer 4 and the lubricant layer 5 are formed on the non-magnetic support 1. In thus-composed magnetic recording medium, the surface projections 13 conforming to the projected portions 3 are formed with a predetermined height and density on the surface of the medium, more specifically on the surface of the lubricant layer 5.

On a back surface of the non-magnetic support 1, the back-coat layer 6 is formed by coating. The back-coat layer 6 can be formed by coating on the non-magnetic support a back-coat coating material prepared by mixing and dispersing an inorganic powder component and a binder resin into an organic solvent.

[Embodiment of the Second Fabrication Method]

This embodiment relates to a method of fabricating a magnetic recording medium according to the second embodiment explained referring to FIG. 3. In this embodiment, similarly to the case of the embodiment of the first fabrication method, the non-magnetic support 1 having the magnetic layer 2 already formed thereon, more specifically the original long non-magnetic material composing the non-magnetic support, is prepared, and on the magnetic layer 2, the discontinuous metal layer 7 as previously shown in FIG. 3 is formed over the entire surface typically by sputtering a metal having an electric conductivity relatively higher than that of the magnetic layer 2.

The sputtering is carried out by exciting glow discharge in an atmosphere mainly containing argon gas at $1\times10^{-1}$ Pa to $1\times10$ Pa, and by bombarding a target using the generated argon ions to thereby sputter the atoms out from the surface thereof. Available methods of sputtering can be classified by glow discharge mechanism into DC double-electrode sputtering or triple-electrode sputtering, radio-frequency sputtering, and magnetron sputtering based on magnetron discharge.

A material available for the discontinuous metal layer 7 is Cu, where the layer is not limited thereto, and any pure metals or alloys are available provided that they can readily and surely be formed in a discontinuous manner by the sputtering process or the like, and that they have electric conductivity higher than that of the magnetic layer 2.

On thus-formed discontinuous metal layer 7, the non-magnetic protective layer 4 typically composed of a carbon film is formed over the entire surface by plasma CVD process as shown in FIG. 3, similarly to the embodiment of the first fabrication method. Because the discontinuous metal layer 7 having a higher electric conductivity over the magnetic layer 2 can adhere a larger amount of source material ions, the carbon film grows in a larger thickness on such discontinuous metal layer 7.

On thus-formed, non-magnetic protective layer 4, the lubricant layer 5 is formed similarly to as described in the above. On the back surface of the non-magnetic support 1, the back-coat layer 6 is formed similarly to as described in the above.

According to the aforementioned magnetic recording medium of the first embodiment and the first fabrication method, the height of the projected portions 3 can be controlled by the thickness of the first non-magnetic protective layer 41 and the second non-magnetic protective layer 42, and the discrete state of the projected portions 3 can be produced by patterning either one of these protective layers, which is the second non-magnetic protective layer 42 herein, by so-called photo-lithographic technique using a photo-resist. Thus the projected portions 3 with a high accuracy and a sufficient height can be formed in a well-controlled manner. The whole portion of the non-magnetic protective layer 4 inclusive of the projected portions 3 can thus be formed using the same material, and this makes the projected portions highly stable and durable.

On the other hand, according to the aforementioned magnetic recording medium of the second embodiment and the second fabrication method, the projected portions 3 having a desired height are formed based on the difference in thickness of the non-magnetic protective layer 4 between the portions formed on the discontinuous metal layer 7 which is previously formed on the magnetic layer 2 and the portions directly formed on the magnetic layer 2. In this case, the height or the like of the projected portions 3 can precisely be controlled by properly selecting the film forming conditions of the non-magnetic protective layer 4 typically in the plasma CVD process. Also in this case, the whole portion of the non-magnetic protective layer 4 inclusive of the projected portions 3 can thus be formed using the same material, and this makes the projection portions highly stable and durable.

Next, the magnetic recording medium and the method of fabricating it will be explained referring to specific examples and in comparison with Comparative Examples.

EXAMPLE 1

In Example 1, the magnetic recording medium of the present invention was fabricated according to the method illustrated in FIGS. 5A to 5D. In the fabrication, on one main surface of the original long non-magnetic material 23 which is to constitute the non-magnetic support 1 and is composed of a polyethylene terephthalate film of 6.0 $\mu$m thick and having a surface roughness Ra of 0.5 nm, Co was deposited in a thickness of 150 nm by the oblique evaporation process using the vacuum evaporation apparatus previously shown in FIG. 4, to thereby form the magnetic layer 2 comprising a ferromagnetic metal thin film. Next, an RF plasma of a mixed gas of ethylene and argon was excited by discharge under application of a DC voltage of 1.5 kV between an electrode and the magnetic recording medium comprising the long non-magnetic material as the counter electrode, and the first non-magnetic protective layer 41 comprising a carbon film of approx. 2 nm thick was formed on the magnetic layer 2.

Further on the non-magnetic protective layer 41, the aforementioned photo-resist layer 8 was formed, and the layer 8 was then light-exposed and developed to produce a photo-resist pattern having discrete through-holes having a diameter of 20 nm in a density of $5 \times 10^7/\text{mm}^2$. Next on the photo-resist pattern, the second non-magnetic protective layer 42 comprising a carbon film was formed typically through the CVD process. The patterned photo-resist layer 8 was then dissolved using an organic solvent so as to remove the portion of the second non-magnetic protective layer 42 integrated with the photo-resist layer 8. The projected portions 3 having a height of 8 nm were formed with the residual portion of the second non-magnetic protective layer 42 in a frequency (diffusion density) of $5 \times 10^7/\text{mm}^2$. Through this process, the non-magnetic protective layer 4 was formed so as to have the projected portions 3 uniformly distributed and well controlled in the frequency and dimension thereof.

Next, on the side of the non-magnetic support 1, or long non-magnetic material, opposite to that having the magnetic layer 2, that is on the back surface, the back-coat layer 6 comprising carbon and polyurethane resin was formed in a thickness of 0.5 $\mu$m. Then on the surface of the non-magnetic protective layer 4, a solution prepared by dissolving a perfluoropolyether-base lubricant into hexane was coated in an amount of 5 mg/m$^2$ to thereby form the lubricant layer 5. The long non-magnetic material was then slit to produce a sample tape having a width of 8 mm (referred to as Sample 1).

EXAMPLE 2

The magnetic recording medium was fabricated according to the same structure and same method of fabrication as described in Example 1, except that the projected portions 3 were made so as to have a height of 16 nm (referred to as Sample 2).

EXAMPLE 3

The magnetic recording medium was fabricated according to the same structure and same method of fabrication as described in Example 1, except that the projected portions 3 were made so as to have a height of 4 nm (referred to as Sample 3).

EXAMPLE 4

The magnetic recording medium was fabricated according to the same structure and same method of fabrication as described in Example 1, except that the projected portions 3 were made in a frequency of $1 \times 10^7/\text{mm}^2$ (referred to as Sample 4).

EXAMPLE 5

The magnetic recording medium was fabricated according to the same structure and same method of fabrication as described in Example 1, except that the projected portions 3 were made in a frequency of $8 \times 10^7/\text{mm}^2$ (referred to as Sample 5).

Comparative Example 1

Figure 4:
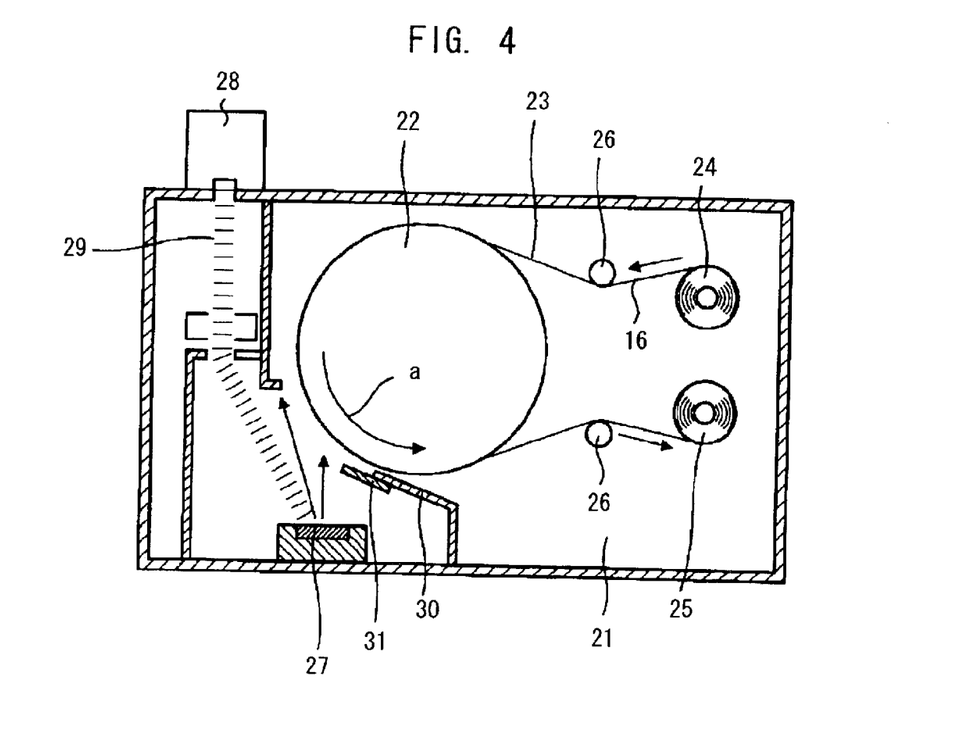
FIG. 4 is a schematic drawing showing an exemplary constitution of a vacuum evaporation apparatus used for fabricating the magnetic recording medium of the present invention.

In the fabrication, on one main surface of the original long non-magnetic material 23 which is to constitute the non-magnetic support 1 and is composed of a polyethylene terephthalate film of 6.0 μm thick and having a surface roughness Ra of 2.0 nm, Co was deposited in a thickness of 150 nm by the oblique evaporation process using the vacuum evaporation apparatus previously shown in FIG. 4, to thereby form the magnetic layer 2 comprising a ferromagnetic metal thin film. Next, an RF plasma of a mixed gas of ethylene and argon was excited by discharge under application of a DC voltage. of 1.5 kV between an electrode and the magnetic recording medium comprising the long non-magnetic material as a counter electrode, and the non-magnetic protective layer comprising a carbon film of approx. 10 nm thick was formed on the magnetic layer 2, without producing the projected portions.

Next, on the side of the non-magnetic support 1, or long non-magnetic material, opposite to that having the magnetic layer 2, that is on the back surface, the back-coat layer 6 comprising carbon and polyurethane resin was formed in a thickness of 0.5 μm. Then on the surface of the non-magnetic protective layer 4 comprising the carbon film, a solution prepared by dissolving a perfluoropolyether-base lubricant into hexane was coated in an amount of 5 mg/m² to thereby form the lubricant layer 5. The long non-magnetic material was then slit to produce a sample tape having a width of 8 mm (referred to as Sample 6).

Comparative Example 2

A sample tape was fabricated according to the same structure and same method of fabrication as described in Example 1, except that a polyethylene terephthalate film having a surface roughness Ra of 2.0 nm was used (referred to as Sample 7).

Comparative Example 3

A sample tape was fabricated according to the same structure and same method of fabrication as described in Example 1, except that the projected portions 3 were made so as to have a height of 24 nm (referred to as Sample 8).

Comparative Example 4

A sample tape was fabricated according to the same structure and same method of fabrication as described in Example 1, except that the projected portions 3 were made so as to have a height of 2 nm (referred to as Sample 9).

Comparative Example 5

A sample tape was fabricated according to the same structure and same method of fabrication as described in Example 1, except that the projected portions 3 were made in a frequency of $5 \times 10^6 / \text{mm}^2$ (referred to as Sample 10).

Comparative Example 6

A sample tape was fabricated according to the same structure and same method of fabrication as described in Example 1, except that the projected portions 3 were made in a frequency of $1.2 \times 10^8 / \text{mm}^2$ (referred to as Sample 11).

The individual constitutions and results of evaluation of the magnetic recording media (Samples 1 to 11) of the individual Examples and Comparative Examples were shown in Table 1.

TABLE 1

| Sample | Constitution of projected portion | Ra of non-magnetic support (nm) | Height of projected portions (nm) | Frequency of projected portions (/mm²) | Head wear (%) | Reproduction output Initial output (dB) | Reproduction output Level down after shuttle-run (dB) | Friction |
|---|---|---|---|---|---|---|---|---|
| Sample 1 (Example 1) | Carbon protective layer | 0.5 | 8 | $5 \times 10^7$ | 0 | 0 | 0 | ○ |
| Sample 2 (Example 2) | Carbon protective layer | 0.5 | 16 | $5 \times 10^7$ | 20 | −0.8 | 0 | ○ |
| Sample 3 (Example 3) | Carbon protective layer | 0.5 | 4 | $5 \times 10^7$ | 10 | 0.5 | 0 | ○ |
| Sample 4 (Example 4) | Carbon protective layer | 0.5 | 8 | $1 \times 10^7$ | −60 | 0.2 | 0 | ○ |
| Sample 5 (Example 5) | Carbon protective layer | 0.5 | 8 | $8 \times 10^7$ | 40 | −0.3 | 0 | ○ |
| Sample 6 (Comparative Example 1) | Surface of support | 2 | — | — | 80 | −2 | 0.4 | ○ |
| Sample 7 (Comparartive Example 2) | Carbon protective layer | 2 | 8 | $5 \times 10^7$ | 270 | −3.1 | 0 | ○ |
| Sample 8 (Comparative Example 3) | Carbon protective layer | 0.5 | 24 | $5 \times 10^7$ | 120 | −2.5 | 0 | ○ |
| Sample 9 (Comparative Example 4) | Carbon protective layer | 0.5 | 2 | $5 \times 10^7$ | −50 | 0.8 | −1.2 | X |
| Sample 10 | Carbon | 0.5 | 8 | $5 \times 10^6$ | −80 | 0.5 | — | X |

TABLE 1-continued

| Sample | Constitution of projected portion | Ra of non-magnetic support (nm) | Height of projected portions (nm) | Frequency of projected portions (/mm$^2$) | Head wear (%) | Reproduction output Initial output (dB) | Reproduction output Level down after shuttle-run (dB) | Friction |
|---|---|---|---|---|---|---|---|---|
| (Comparative Example 5) | protective layer | | | | | | | |
| Sample 11 (Comparative Example 6) | Carbon protective layer | 0.5 | 8 | 1.2 × 10$^8$ | 500 | −0.5 | 0 | ○ |

In the evaluation, a thermostatic chamber was conditioned at a temperature of 25° C. and a humidity of 50% RH, and in this chamber, the sample tapes corresponding to Samples 1 to 11 were subjected to shuttle run repeated 1,000 times, which corresponds 2,000 passes on the magnetic head, using a modified 8-mm tape drive, to thereby measure the amount of wear and reproduction output of the magnetic head with which the Samples make contact.

The amount of head wear was compared in a form of difference in percent from the referential value (0%), that is, the amount of head wear shown with regard to Sample 1. The reproduction output was compared in a form of difference in dB from the referential value, that is, the reproduction output shown with regard to Sample 1.

The friction was evaluated as ○ if no problem was found during the shuttle-run repeated 1,000 times, and evaluated as X if the friction disabled the running, or the running was interrupted before being repeated 1,000 times.

Comparative Example 1 (Sample 6), which corresponds to a sample tape fabricated by the conventional fabrication method, showed only a smaller initial output as compared with Example 1 to 5 (Samples 1 to 5) due to rougher surface and thicker non-magnetic protective layer. The amount of head wear was found to be large. It was also found that the output after the shuttle run was lowered, showing lower running durability despite thicker non-magnetic protective layer. Comparative Example 2 (Sample 7) showed results similar to those of Comparative Example 1 (Sample 6) because the roughness of the non-magnetic support was large enough to roughen the surface of the magnetic recording medium excessively than predicted from the carbon-made projected portions 3. This sample however showed no changes in the reproduction output possibly because the initial reproduction output was too low. Comparative Example 3 (Sample 8) showed a low initial output, because too large height of the carbon-made projected portions 3 expanded the spacing with respect to the magnetic head. The amount of head wear was also found to be large. Comparative Example 4 (Sample 9) showed a large friction and a large decrease in the reproduction output after shuttle run, because the height of the carbon projected portions were too small. Comparative Example 5 (Sample 10) was unsuccessful in achieving normal running because the frequency of the carbon projected portions was too small and the friction was large. Comparative Example 6 (Sample 11) showed a large head wear since the frequency of the carbon projected portions was too large.

Next, specific examples for the case where the magnetic recording medium shown in FIG. 3 is fabricated according to the second embodiment will be explained in comparison with Comparative Examples.

EXAMPLE 6

In the fabrication, on one main surface of the original long non-magnetic material 23 which is to constitute the non-magnetic support 1 and is composed of a polyethylene terephthalate film of 6.0 μm thick and having a surface roughness Ra of 0.5 nm, Co was deposited in a thickness of 50 nm by the oblique evaporation process while introducing a small amount of oxygen, using the vacuum evaporation apparatus previously shown in FIG. 4, to thereby form the magnetic layer 2 comprising a ferromagnetic metal thin film.

Next, the discontinuous metal layer 7 comprising a discontinuous metal thin film extremely as thin as approx. 1 nm was formed on the ferromagnetic metal thin film by the magnetron sputtering process using a Cu target under conditions of an Ar gas pressure of 2×10$^{-1}$ Pa, and an applied voltage of 0.5 kV. On the discontinuous metal layer 7, the non-magnetic protective layer 4 was grown through the plasma CVD process.

In the formation of the non-magnetic protective layer 4, an RF plasma of a mixed gas of ethylene and argon was excited by discharge under application of a DC voltage of 1.5 kV between an electrode and the magnetic recording medium per se in a form of a long non-magnetic material as a counter electrode, and a carbon film was allowed to deposit as the non-magnetic protective layer 4.

By this process, the non-magnetic protective layer 4 having a thickness distribution was formed so as to have a larger thickness $T_1'$ of approx. 10 nm over the discontinuous metal layer 7 which has a higher electric conductivity and is capable of promoting carbon adhesion, and so as to have a smaller thickness $T_2$ of approx. 2 nm over the through-hole area of the discontinuous metal layer 7, that is, the portion where the discontinuous metal layer 7 is removed and the magnetic layer 2 is exposed.

Thus the projected portions 3 were formed at the portions having the discontinuous metal layer 7. Because the thickness of the discontinuous metal layer 7 was sufficiently small as compared with the large thickness $T_1'$ of the non-magnetic protective layer 4, the height of the projected portions 3 was given as $T_1'-T_2=8$ nm. The frequency of the projected portions 3 was approx. 5×10$^7$/mm$^2$.

Next, on the back surface of the non-magnetic support 1, or long non-magnetic material, the back-coat layer 6 comprising carbon and polyurethane resin was formed in a thickness of 0.5 μm. Then on the surface of the non-magnetic protective layer 4, a solution prepared by dissolving a perfluoropolyether-base lubricant into hexane was coated in an amount of 5 mg/m$^2$ to thereby form the lubricant layer 5. The long non-magnetic material was then slit to produce a sample tape having a width of 8 mm (referred to as Sample 12).

EXAMPLE 7

The magnetic recording medium was fabricated according to the same structure and same method of fabrication as described in Example 6, except that the non-magnetic protective layer 4 was formed so as to have the projected portions 3 having a height of 16 nm (referred to as Sample 13).

EXAMPLE 8

The magnetic recording medium was fabricated according to the same structure and same method of fabrication as described in Example 6, except that the non-magnetic protective layer 4 was formed so as to have the projected portions 3 having a height of 4 nm (referred to as Sample 14).

EXAMPLE 9

A sample tape was fabricated according to the same structure and same method of fabrication as described in Example 6, except that the projected portions 3 were made in a frequency of $1 \times 10^7/mm^2$ (referred to as Sample 15).

EXAMPLE 10

A sample tape was fabricated according to the same structure and same method of fabrication as described in Example 6, except that the projected portions 3 were made in a frequency of $8 \times 10^7/mm^2$ (referred to as Sample 16).

Comparative Example 7

In the fabrication, on one main surface of the original long non-magnetic material which is to constitute the non-magnetic support 1 and is composed of a polyethylene terephthalate film of 6.0 μm thick and having a surface roughness Ra of 2.0 nm, Co was deposited in a thickness of 50 nm by the oblique evaporation process using the vacuum evaporation apparatus previously shown in FIG. 4, to thereby form the magnetic layer 2 comprising a ferromagnetic metal thin film. Next, an RF plasma of a mixed gas of ethylene and argon was excited by discharge under application of a DC voltage of 1.5 kV between an electrode and the magnetic recording medium comprising the long non-magnetic material as a counter electrode, and the non-magnetic protective layer 4 comprising a carbon film of approx. 10 nm thick was formed on the magnetic layer 2.

Next, on the back surface of the non-magnetic support 1 in a form of a long non-magnetic material, the back-coat layer 6 comprising carbon and polyurethane resin was formed in a thickness of 0.5 μm. Then on the surface of the non-magnetic protective layer 4 comprising the carbon film, a solution prepared by dissolving a perfluoropolyether-base lubricant into hexane was coated in an amount of 5 mg/m² to thereby form the lubricant layer 5. The long non-magnetic material was then slit to produce a sample tape having a width of 8 mm (referred to as Sample 17).

Comparative Example 8

A sample tape was fabricated according to the same structure and same method of fabrication as described in Example 6, except that a polyethylene terephthalate film having a surface roughness Ra of 2 nm was used as the non-magnetic support 1 (referred to as Sample 18).

Comparative Example 9

A sample tape was fabricated according to the same structure and same method of fabrication as described in Example 6, except that the non-magnetic protective layer 4 was formed so as to have the projected portions 3 having a height of 24 nm (referred to as Sample 19).

Comparative Example 10

A sample tape was fabricated according to the same structure and same method of fabrication as described in Example 6, except that the non-magnetic protective layer 4 was formed so as to have the projected portions 3 having a height of 2 nm (referred to as Sample 20).

EXAMPLE 11

A sample tape was fabricated according to the same structure and same method of fabrication as described in Example 6, except that the projected portions 3 were made in a frequency of $5 \times 10^6/mm^2$ (referred to as Sample 21).

EXAMPLE 12

A sample tape was fabricated according to the same structure and same method of fabrication as described in Example 6, except that the projected portions 3 were made in a frequency of $1.2 \times 10^8/mm^2$ (referred to as Sample 22).

Eleven sample tapes obtained in Examples 6 to 10 and Comparative Examples 17 to 22 (Samples 12 to 22) were measured and evaluated by the methods similarly to as previously described for the Samples 1 to 11. Results of the measurements were shown in Table 2.

TABLE 2

| Sample | Constitution of projected portion | Ra of non-magnetic support (nm) | Height of projected portions (nm) | Frequency of projected portions (/mm²) | Head wear (%) | Reproduction output | | Friction |
|---|---|---|---|---|---|---|---|---|
| | | | | | | Initial output (dB) | level down after shuttle-run (dB) | |
| Sample 12 (Example 6) | Carbon protective layer | 0.5 | 8 | $5 \times 10^7$ | 0 | 0 | 0 | ○ |
| Sample 13 (Example 7) | Carbon protective layer | 0.5 | 16 | $5 \times 10^7$ | 20 | −0.8 | 0 | ○ |
| Sample 14 (Example 8) | Carbon protective layer | 0.5 | 4 | $5 \times 10^7$ | −10 | 0.5 | 0 | ○ |

TABLE 2-continued

| Sample | Constitution of projected portion | Ra of non-magnetic support (nm) | Height of projected portions (nm) | Frequency of projected portions (/mm²) | Head wear (%) | Reproduction output Initial output (dB) | Reproduction output level down after shuttle-run (dB) | Friction |
|---|---|---|---|---|---|---|---|---|
| Sample 15 (Example 9) | Carbon protective layer | 0.5 | 8 | $1 \times 10^7$ | −60 | 0.2 | 0 | ○ |
| Sample 16 (Example 10) | Carbon protective layer | 0.5 | 8 | $8 \times 10^7$ | 40 | −0.3 | 0 | ○ |
| Sample 17 (Comparative Example 7) | Surface of support | 2 | — | — | 80 | −2 | −0.4 | ○ |
| Sample 18 (Comparative Example 8) | Carbon protective layer | 2 | — | $5 \times 10^7$ | 270 | −3.1 | 0 | ○ |
| Sample 19 (Comparative Example 9) | Carbon protective layer | 0.5 | 24 | $5 \times 10^7$ | 120 | −2.5 | 0 | ○ |
| Sample 20 (Comparative Example 10) | Carbon protective layer | 0.5 | 2 | $5 \times 10^7$ | −50 | 0.8 | −1.2 | X |
| Sample 21 (Comparative Example 11) | Carbon protective layer | 0.5 | 8 | $5 \times 10^6$ | −80 | 0.5 | — | X |
| Sample 22 (Comparative Example 12) | Carbon protective layer | 0.5 | 8 | $1.2 \times 10^8$ | 500 | −0.5 | 0 | ○ |

Comparative Example 7 (Sample 17), which corresponds to a sample tape fabricated by the conventional fabrication method, showed only a smaller initial output as compared with Examples 6 to 10 (Samples 12 to 16) due to rougher surface and thicker non-magnetic protective layer. The amount of head wear was found to be large. It was also found that the output after the shuttle run was lowered, showing lower running durability despite thicker non-magnetic protective layer. Comparative Example 8 (Sample 18) showed results similar to those of Comparative Example 7 (Sample 17) because the roughness of the non-magnetic support was large enough to roughen the surface of the magnetic recording medium excessively than predicted from the carbon-made projected portions 3. This sample however showed no changes in the reproduction output possibly because the initial reproduction output was too low. Comparative Example 9 (Sample 19) showed a low initial output, because too large height of the projected portions 3 expanded the spacing with respect to the magnetic head. The amount of head wear was also found to be large. Comparative Example 10 (Sample 20) showed a large friction and a large decrease in the reproduction output after shuttle run, because the height of the carbon-made projected portions 3 was too small. Comparative Example 11 (Sample 21) was unsuccessful in achieving normal running because the frequency of the carbon-made projected portions 3 was too small and the friction was large. Comparative Example 12 (Sample 22) showed a large head wear since the frequency of the projected portions was too large.

As has been described in the above, since the projected portions 3 are made by the non-magnetic protective layer 4 in the magnetic recording medium of the present invention, the surface roughness of the non-magnetic support 1 can be suppressed as low as 1 nm or below, and selection of such roughness successfully avoids influence on the characteristics of the magnetic layer 2.

The projected portions 3 in the magnetic recording medium of the present invention are formed based on thickness distribution of the non-magnetic protective layer 4, where too small thickness of the projected portions 3 may ruin the durability of the magnetic recording medium. This is because, while the projected portions are basically intended for reducing friction by supporting the magnetic recording medium only by themselves, too small projected portions may rapidly reduce their size due to wear, may inhibit absorption of elastic deformation of the magnetic recording medium, and may consequently raise friction due to a widened contact area established also by the portions other than the projected portions, to thereby promote deterioration of the magnetic recording medium. As indicated by Samples 9 and 20 in Tables 1 and 2, a height of the projected portions of 2 nm, for example, was found to ruin the durability. Based on the experimental results, the height of 3 nm or above, and more preferably 4 nm or above was found to satisfy the required durability. On the contrary, too large height of the projected portions 3, more specifically as large as 24 nm as shown by Samples 8 and 19 in Tables 1 and 2, the reproduction output may be degraded due to increased spacing loss with regard to the magnetic head. Based on the experimental results, the height of the projected portions is preferably 20 nm or below, and more preferably 16 nm or below.

As for the thickness of the non-magnetic protective layer 4, too small thickness of the thinner portion may make the whole layer discontinuous, and may cause defects. If the magnetic layer should expose in such defects, degradation of durability may occur, such that the magnetic layer may be oxidized to ruin the characteristics thereof, or the non-magnetic protective layer 4 tends to peel off due to its discontinuity. To avoid such nonconformities, the thickness of the non-magnetic protective layer 4 is defined as 1 nm or above. Since too large thickness of the non-magnetic protective layer 4 may increase the spacing loss, the thickness is preferably limited to 5 nm or below as judged from the experimental results.

As for the average frequency of the projected portions 3, a too small value may allow the portion of the magnetic recording medium other than the projected portions 3 to contact with the slide-contact portion of the magnetic head due to elastic deformation of the medium, to thereby increase the contact area. This may eventually increase friction and may cause so-called sticking of the magnetic recording medium resulting in deterioration. As judged from the results shown in Tables 1 and 2, the average frequency of the projected portions 3 is preferably defined as $1 \times 10^7/\text{mm}^2$ or above. Too high average frequency of the projected portions may coarsen the surface of the magnetic recording medium, and may have a large number of sharp projected portions causative of wear of the magnetic head, and may promote the wear of the magnetic head. It is thus preferable to define the average frequency as $8 \times 10^7/\text{mm}^2$ or below as judged from the results shown in Tables 1 and 2.

What is claimed is:

1. A magnetic recording medium comprising:
   a magnetic layer; a non-magnetic protective layer formed as a layer above the magnetic layer having projected portions formed in a discrete manner; and a lubricant layer formed as a layer above the non-magnetic protective layer, wherein said lubricant layer has on a surface thereof surface projections originating from said projected portions of said non-magnetic protective layer;
   wherein said non-magnetic protective layer is a carbon film, and
   a surface of a non-magnetic support has a roughness Ra (center average roughness) of 1 nm or less.

2. The magnetic recording medium as claimed in claim 1, wherein said non-magnetic protective layer is formed directly on said magnetic layer, and an entire portion thereof including said projected portions is composed of the same material.

3. The magnetic recording medium as claimed in any one of claims 1 and 2, wherein:
   said non-magnetic protective layer further comprises a first non-magnetic protective layer and a second non-magnetic protective layer stacked on said first non-magnetic protective layer, either one of said first and second non-magnetic protective layers being formed discontinuously and the other one being formed over the entire surface.

4. The magnetic recording medium as claimed in any one of claims 1 and 2, wherein:
   said non-magnetic protective layer having a thickness distribution is formed so as to extend over a discontinuous metal layer which is formed on said magnetic layer and has an electric conductivity higher than that of said magnetic layer, and
   said non-magnetic protective layer is formed thicker on said discontinuous metal layer so as to form said projected portions originating from said thickness distribution.

5. The magnetic recording medium as claimed in claim 1, wherein said thickness distribution of said non-magnetic protective layer is within a range from 1 nm to 6 nm in terms of an average thickness of thin portions thereof.

6. The magnetic recording medium as claimed in claim 1, wherein said thickness distribution of said non-magnetic protective layer is within a range from 3 nm to 20 nm in terms of an average thickness difference between thick portions and the thin portions thereof.

7. A method of fabricating a magnetic recording medium, comprising:
   forming a magnetic layer as a layer above a non-magnetic support;
   forming a non-magnetic protective layer having projected portions as a layer above the magnetic layer; and
   forming a lubricant layer;
   said step of forming said non-magnetic protective layer having the projected portions comprises forming a first non-magnetic protective layer and forming a second non-magnetic protective layer, wherein:
   either one of said steps of forming the first and second non-magnetic protective layers is a film forming step in which said non-magnetic protective layer is formed discontinuously based on mask processing, and
   the other step is a film forming step in which said non-magnetic protective layer is formed over an entire surface.

8. A method of fabricating a magnetic recording medium, comprising:
   forming a magnetic layer as a layer above a non-magnetic support;
   forming a non-magnetic protective layer having projected portions as a layer above the magnetic layer; and
   forming a lubricant layer;
   forming said non-magnetic protective layer comprises forming a discontinuous metal layer having an electric conductivity higher than that of said magnetic layer, and forming a non-magnetic protective layer over the entire surface so as to cover also the discontinuous metal layer thereafter, and
   said projected portions are formed to be thicker above said discontinuous metal layer.

9. The method of fabricating a magnetic recording medium as claimed in claim 8, wherein said non-magnetic protective layer is formed through a CVD (chemical vapor deposition) process for forming a carbon film.

10. A magnetic recording medium comprising:
    a magnetic layer, a non-magnetic protective layer as a layer above the non-magnetic layer having projected portions formed thereon in a discrete manner; and a lubricant layer over the protective layer, wherein said lubricant layer has on a surface thereof surface projections originating from said projected portions of said non-magnetic protective layer;
    wherein said non-magnetic protective layer further comprises a first non-magnetic protective layer and a second non-magnetic protective layer stacked on said first non-magnetic protective layer, either one of said first and second non-magnetic protective layers being formed discontinuously and the other one being formed over the entire surface.

11. A magnetic recording medium comprising a magnetic layer; a non-magnetic protective layer as a layer above the non-magnetic layer having projected portions formed thereon in a discrete manner and a lubricant layer over the protective layer, wherein said lubricant layer has on a surface thereof surface projections originating from said projected portions of said non-magnetic protective layer;
    wherein said non-magnetic protective layer is formed so as to extend over a discontinuous metal layer which is formed on said magnetic layer and has an electric conductivity higher than that of said magnetic layer, and
    said non-magnetic protective layer is formed thicker on said discontinuous metal layer so as to form said projected portions.

* * * * *